United States Patent [19]

Ekdahl et al.

[11] Patent Number: 5,338,140
[45] Date of Patent: Aug. 16, 1994

[54] BOLL BUGGY

[75] Inventors: Royce L. Ekdahl; C. Minuard Jordan, both of Lubbock, Tex.

[73] Assignee: Scott Manufacturing, Inc., Lubbock, Tex.

[21] Appl. No.: 42,862

[22] Filed: Apr. 5, 1993

[51] Int. Cl.⁵ ............................................. B65G 67/04
[52] U.S. Cl. ..................... 414/346; 414/347; 414/528; 414/495; 414/501; 414/525.5; 414/786; 414/397; 298/11; 56/16.6
[58] Field of Search ............... 298/1 B, 11; 414/340, 414/343, 345, 346, 347, 349, 351, 352, 408, 409, 353, 387, 527, 528, 525.5, 786, 495, 501, 502, 503; 56/16.6, 28

[56] References Cited

U.S. PATENT DOCUMENTS

| | | | |
|---|---|---|---|
| 3,503,531 | 3/1970 | Barberi | 414/525.5 X |
| 3,998,491 | 12/1976 | Diem | 298/11 |
| 4,347,696 | 9/1982 | Johnson | 56/16.6 |
| 4,362,457 | 12/1982 | Taylor et al. | 414/345 |
| 4,382,631 | 5/1983 | Johnson | 298/175 G |
| 4,717,307 | 1/1988 | Ciuffetelli | 414/343 X |

FOREIGN PATENT DOCUMENTS

| | | | |
|---|---|---|---|
| 535592 | 2/1955 | Belgium | 298/11 |
| 719861 | 2/1938 | Fed. Rep. of Germany | 298/11 |
| 787212 | 12/1980 | U.S.S.R. | 414/346 |

*Primary Examiner*—Frank E. Werner
*Attorney, Agent, or Firm*—Wendell Coffee

[57] ABSTRACT

A boll buggy includes a basket upon a wheeled frame. The basket is translationally elevated to a height so that the bottom of the basket is higher than the top of a module maker. Seed cotton is transferred from the basket into the module maker by chains running along the bottom of the basket and extended panel. Cotton is loaded into the basket on the boll buggy by moving the boll buggy alongside a cotton harvester and extending a load door from the basket to receive cotton from the cotton harvester.

9 Claims, 4 Drawing Sheets

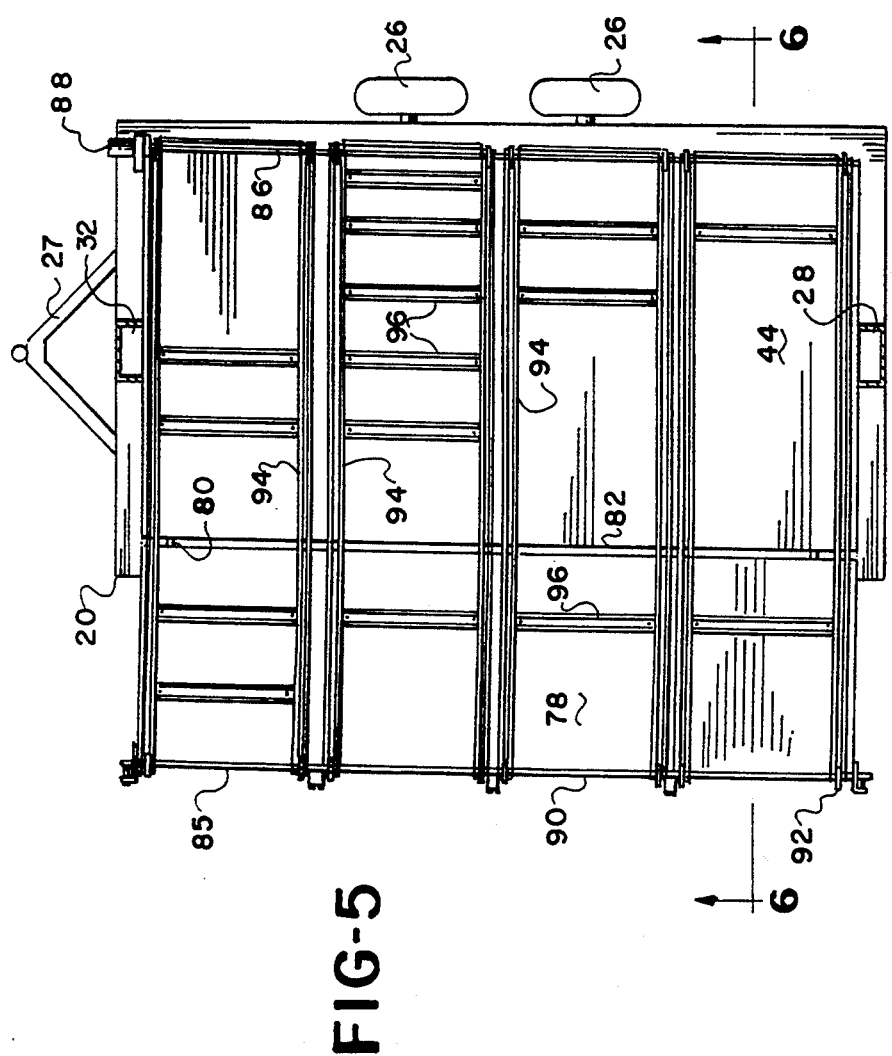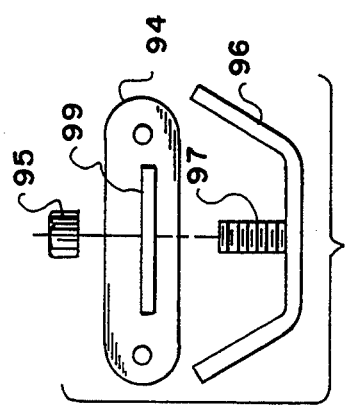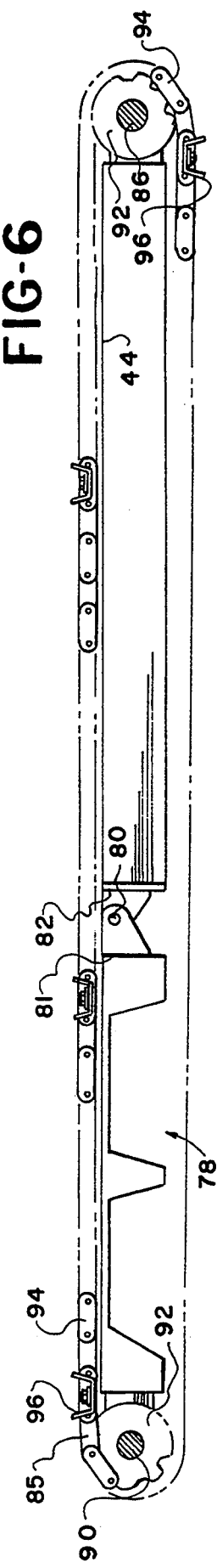

BOLL BUGGY

CROSS REFERENCE TO RELATED APPLICATION

None, however, Applicant filed Disclosure Document Number 320,052 on Nov. 4, 1992, which document concerns this application; therefore, by separate paper it is respectfully requested that the document be retained and acknowledgment thereof made by the Examiner. (MoPEP 1706)

BACKGROUND OF THE INVENTION

1. Field of the Invention

This invention relates to harvesting cotton and more particularly to a unit for transferring the harvested cotton from a cotton harvester to a module maker. Such a unit is commonly called a boll buggy in the art. A cotton farmer is one having ordinary skill in this art.

2. Description of the Related Art

The need for a unit to transfer cotton from a harvester to a module maker has been recognized. Specifically, JOHNSON U.S. Pat. No. 4,347,696, describes one such unit where the harvested cotton was transferred into a basket and then the basket lifted from its framework by lifting mechanisms on the module maker. JOHNSON U.S. Pat. No. 4,382,631, discloses a unit wherein the basket that received the harvested seed cotton from the harvester was rotated about the upper edge of the basket which was at a height above the module maker in order to dump it in the module maker. The top of the basket was angled so that it could receive cotton from the harvester on the low edge and dump the cotton into a module maker from the elevated edge.

Also, Case I-H, an agricultural machinery manufacturer has on the market a large cotton harvester which unloads the cotton harvester basket by drag chains from an extended panel somewhat similar to that disclosed in this invention.

Despite the recognition of the desirability of providing a boll buggy, still today much of the cotton is transferred from the harvester to the module maker by pulling the harvester adjacent to the module maker and dumping the basket of harvested cotton directly from the harvester into the module maker.

SUMMARY OF THE INVENTION

1. Progressive Contribution to the Art

The boll buggy herein includes a basket which is mounted on a running gear or a frame unit. The frame includes a column whereby the basket can be raised and lowered in a translational movement. i.e., there is no rotational movement as the basket is elevated by upward movement along the columns. When it is at the highest level, a discharge panel is folded out from a discharge side of the basket and the seed cotton within the basket discharged by a series of drags mounted on chains moving across the bottom of the basket and discharge panel.

The basket is loaded when it is in the lower position by folding a loading tray or loading door outward so that it can extend beneath the basket dump of a cotton harvester. As soon as the cotton is dumped from the harvester basket onto the loading tray or loading door, then the door is pivoted toward the basket, transferring the cotton to within the basket and continued movement of the door compresses the cotton into the basket to some degree. By this process the boll buggy basket will hold at least three times as much as the harvester basket. Therefore the boll buggy can receive cotton from three full harvester baskets and then go to the module maker and unload into the module maker as previously described. With the loading door fully retracted or moved entirely into the basket, the top of the load door is no higher than the top of the basket. The basket itself, in the lower position, is well within the limits which is permitted for travel on public roads and highways without any special permit. Also, the width of the unit with the door in the full retracted position and with the loading panel in the loaded position, it has a width which permits it to move on public roads and highways without any special permit.

When unloading the harvested cotton from the boll buggy, if the module maker fills before the complete boll buggy basket is unloaded, the chains that normally discharge the cotton from the boll buggy may be reversed. Upon reversing of the chains, this brings the cotton back into the boll buggy to some extent, at least sufficiently to close the discharge panel.

2. Objects of this Invention

An object of this invention is to to transfer harvested cotton from a harvester into a module maker.

Further objects are to achieve the above with devices that are sturdy, compact, durable, lightweight, simple, safe, efficient, versatile, ecologically compatible, energy conserving, and reliable, yet inexpensive and easy to manufacture, operate, and maintain.

Other objects are to achieve the above with a method that is rapid, versatile, ecologically compatible, energy conserving, efficient, and inexpensive, and does not require highly skilled people to operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 5 is a top plan view of the chain and drags along the floor of the basket and the extended discharge panel taken substantially along line 5—5 of FIG. 4.

FIG. 6 is a sectional view taken substantially on line 6—6 of FIG. 5 showing the chain and drags used to discharge cotton from the boll buggy.

FIG. 7 is a detailed view of connection of one of the drags to the chain.

Figure 1:
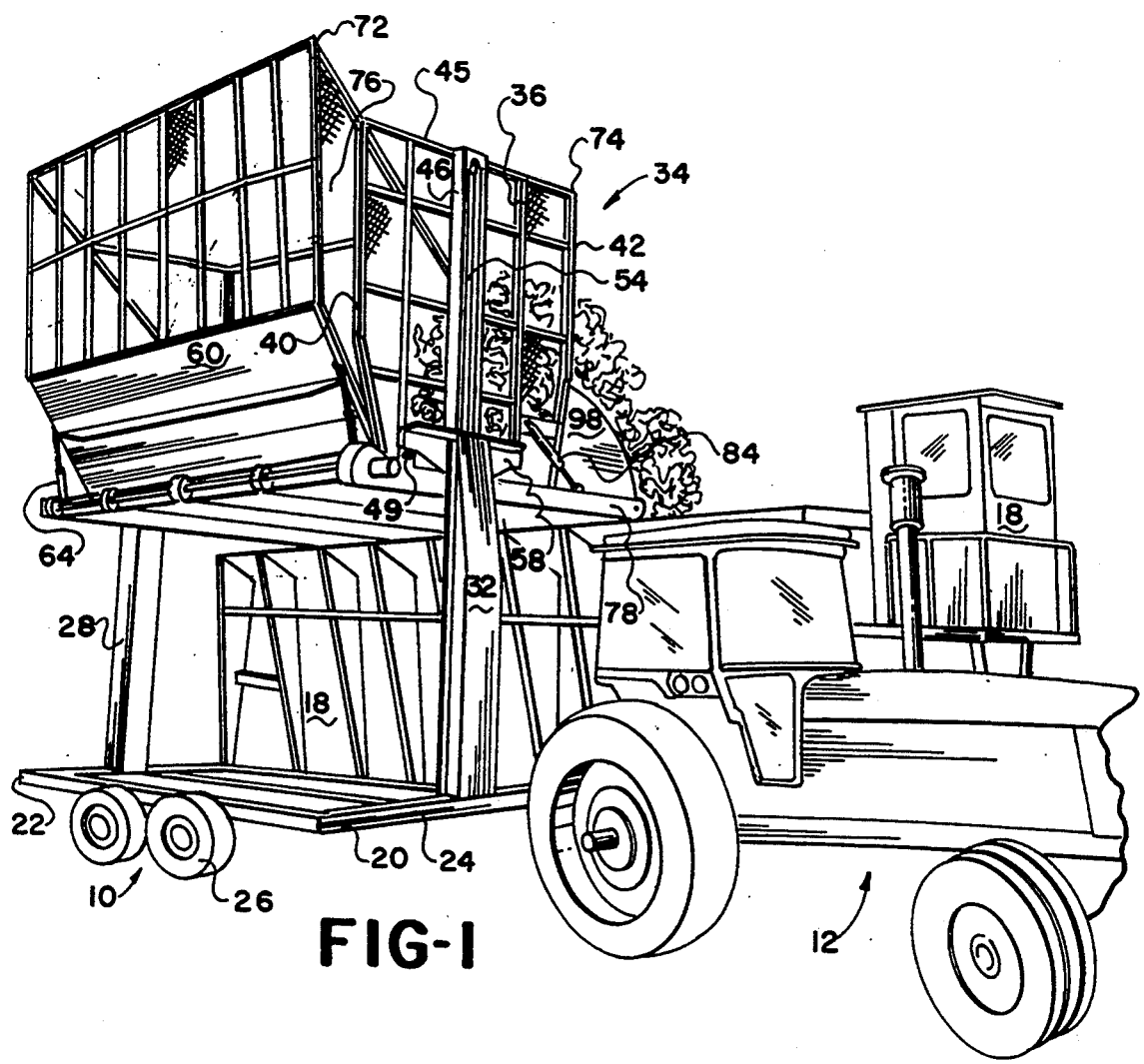
FIG. 1 is a perspective view of a boll buggy according to this invention being connected to a towing tractor and shown in the process of discharging harvested cotton into a module maker.

As an aid to correlating the terms of the claims to the exemplary drawing(s), the following catalog of elements is provided:
10 boll buggy
12 tractor
14 harvester
16 overhead basket
18 module maker
20 base frame
22 rear
24 front
26 ground engaging wheels
27 hitch means
28 column rear
32 column front
34 basket
36 front
38 back
40 load side
42 discharge side
44 bottom
45 top
46 vertical tracks
49 stops
50 vertical tracks
52 guides
54 front elevating hydraulic cylinders
56 rear elevating hydraulic cylinders
58 wings
60 load door
62 door hinges
64 compression hydraulic cylinders
66 load side edge
70 ear
72 upper edge of door
  74 discharge top edge of basket
  76 wing walls
  78 discharge panel
  80 discharge hinges
  81 hinge edge
82 discharge edge
84 discharge hydraulic cylinders
85 distal edge
86 load side shaft
88 discharge motor
90 distal shaft
92 sprockets
94 chains
95 nut
96 drags
97 stud
98 wing walls
99 tab

DESCRIPTION OF THE PREFERRED EMBODIMENTS:

Referring to the drawings there may be seen a seed cotton transfer unit or boll buggy 10. As seen, the boll buggy is hitched to tractor 12 (FIG. 1) which forms a means for moving the boll buggy from one location to another and also supplies hydraulic fluid under pressure to operate the various hydraulic cylinders and motors. As stated before, the purpose of the boll buggy is to receive cotton from harvester 14 having overhead basket 16. (FIG. 2) Such harvester units are well known to the art and as discussed above, in normal operation would be pulled adjacent to module maker 18 and the basket 16 dumped directly into the module maker. One type of harvester is often referred to as a "cotton stripper".

The boll buggy has base frame 20 which will have a rear 22 and front 24. The frame will also have ground engaging wheels 26 so that it may be moved by the tractor 12 from one location to another. Hitch means 27 (FIG. 5) is attached to the front of the frame to provide means for attaching the frame to the tractor, which is a towing vehicle. This hitch 27 has only been shown schematically, inasmuch as it is conventional in design.

Rear stanchion, or post, or column 28 is attached to the rear 22 of the frame 20. The column may be braced by struts, or supports, or braces, however, such may not be necessary and therefore not shown. Front column 32 is mounted on the front of the frame and it likewise might be reinforced or braced by braces.

Basket 34 is mounted on the frame 20 as will be more fully explained later. The basket is made of structural metal framework and has a covering of mesh or screen there over. The basket has front 36, back 38, load side 40, discharge side 42, bottom 44, and top 45. Vertical tracks 46 on the front 36 of the basket mate with guides (not shown) on the front column 32. Likewise vertical tracks 50 upon the rear or back 38 of the basket 34 mate with guides 52 which are mounted upon the rear column 28. The front guides are identical to the back guides 52.

Stops 49 are attached near the bottom 44 of the front 36 and back 38 on either side of the tracks 50.

Elevating hydraulic cylinder 54 interconnects the frame 20 with the tracks 46 at the front 36. Likewise, rear hydraulic elevating cylinder 56 inner-connects the frame 20 with the rear tracks 50.

When the term, "hydraulic cylinder" is used herein it is intended to indicate a specific type of hydraulic motor, which has both a cylinder and a ram or piston so that with the proper application of hydraulic fluid the cylinder can either be expanded or contracted. By expanded is meant that the ram would extend from the cylinder and to contract would indicate that the ram is contracted into the cylinder. However, for concise description the operation is spoken of as either expanding or contracting the hydraulic cylinder.

When the front and back elevating cylinders 54 and 56 are expanded the basket will be raised vertically with respect to the frame and with respect to the ground upon which the frame is supported. This vertical movement will be a translation movement meaning that each part of the basket will be moving vertically at the same speed and on a parallel path to each other portion of the basket.

The translational movement of the basket 34 is in contrast to the movement of the overhead basket 16 upon the stripper 14 and with the movement of the basket of JOHNSON U.S. Pat. No. 4,382,631. Those baskets will rotate about a pivot in a swinging or rotational movement rather than in a translational movement as is the case with basket 34.

Figure 2:
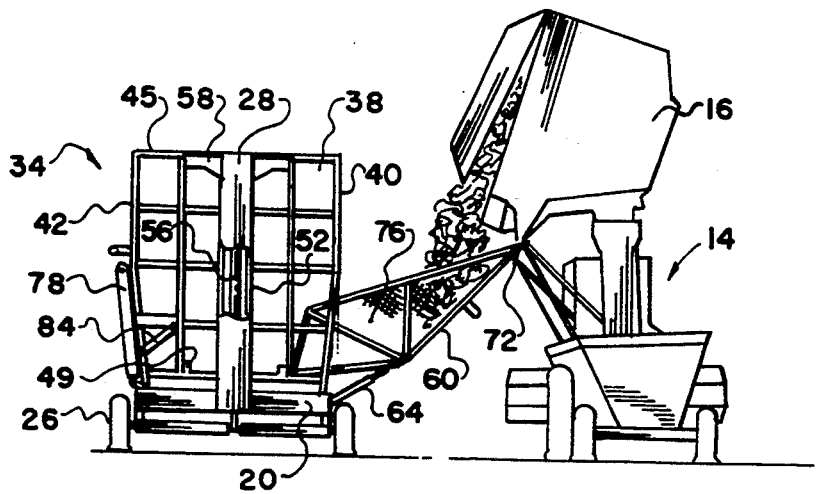
FIG. 2 is a rear elevational view of a boll buggy according to this invention in the process of loading cotton into the boll buggy from a cotton harvester. The cover of the rear column was partially broken away to show some internal construction.
Figure 4:
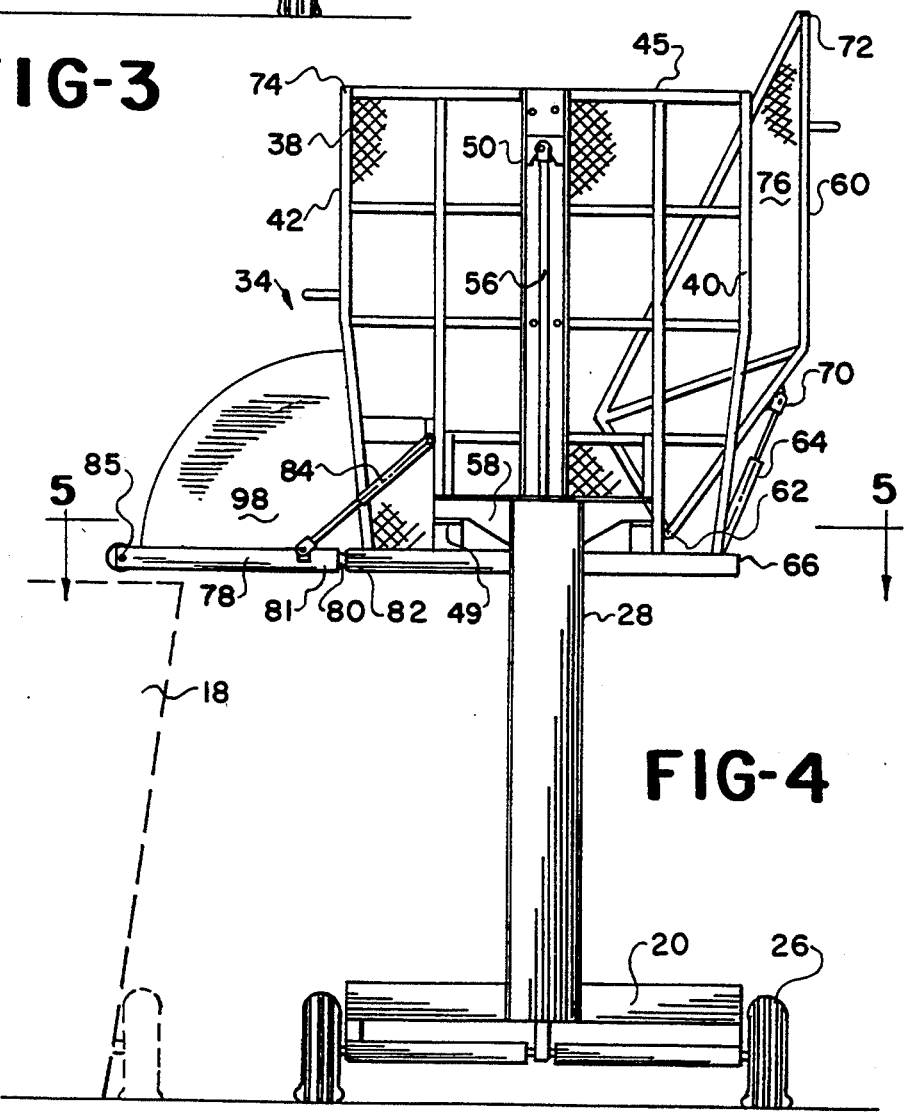
FIG. 4 is a rear elevational view of a boll buggy with the basket in the elevated position and the discharge panel extended with the module maker shown in the dash line.
Figure 8:
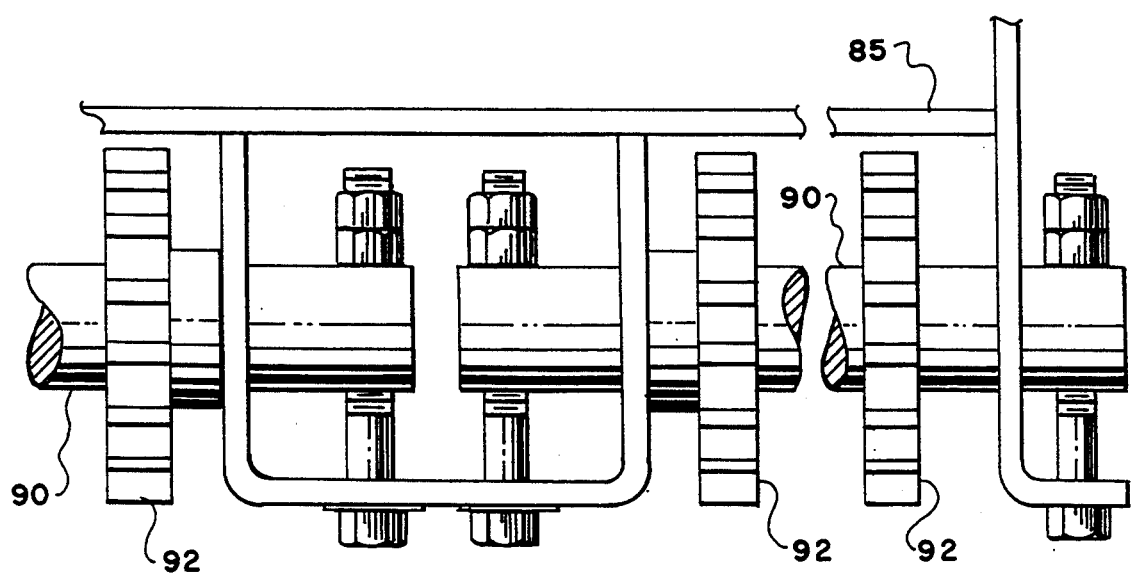
FIG. 8 is a detailed view of the adjustment structure for moving the distal shafts to adjust the tension of the chains.

Wings 58 upon the top of each of the columns 28 and 32 extend horizontally from the column. These wings cooperate with the metal frame of the basket 34 to hold the basket in position when it is elevated as seen in FIGS. 1 and 4. The stops 49 function to stop the basket 34 in the elevated position and hold it there.

Load door 60 is hinged and swung to the bottom 44 of the basket. The load side of the basket 34 is open except for the load door 60. Door hinges 62 are located near the bottom approximately one sixth of the width of the bottom from the load side. The door hinges interconnect the load door 60 and the walls at the front 36 and the back 38. The hinges swing the door to the basket. Compression hydraulic cylinders 64 interconnect the bottom 44 of the basket near load side edge 66 to the load door 60 one third of the height of the load door. The height of the load door is the distance from the hinge 62 to top 72 of the door 60. I.e., the distance from the hinge 62 to ear 70 whereby the compression hydraulic cylinder is attached to the load door is about one third the total distance from the hinge 62 to upper edge 72 of the load door.

The basket will have a height which may be taken as the distance from the bottom 44 to the top 45. The basket height will be about 10 feet. The bottom of the basket, when it is in its bottom position, will be about 3 and ¼ feet above the ground so that the top of the basket from the ground will be about 13 and ¼ feet tall. This is important because it is desirable that the boll buggy have a height that is not greater than the legal height to be operated and transported upon the public roads and highways. Thus, an operator can move the boll buggy from one farm location to another on public roads and highways without the necessity of obtaining special permits.

Figure 3:
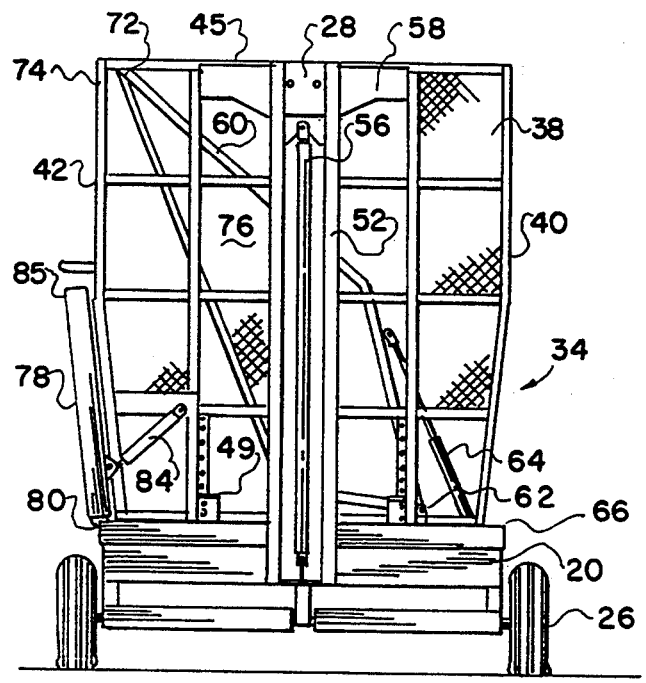
FIG. 3 is a rear elevational view of the boll buggy according to this invention with the loading door fully retracted and the discharge panel retracted as it would be transported down a public road. Also, FIG. 3 has the cover of the rear column removed to show internal details.

As may be seen in FIG. 4, when the load door is in the full position it is higher than the top 45 of the basket. However, the load door and the hinges 62 are so that the load door may be folded all the way over so it is completely inside of the basket and top or load door upper edge 72 is against discharge top edge 74 of the discharge side 42. (FIG. 3) In this empty position the total height of the unit or any portion thereof is only about 13 and ¼ feet and therefore permissible for operation on the public roads and highways. In this regard, the total width of the unit is 11 feet which is also within the width limit for operation on public roads and highways without special permits.

The length of the basket from front 36 to back 38 is 18 feet. Of course, this does not include the thickness of the columns nor the hitch 27 which is connected to the tractor 12.

The compress cylinders 64 are so called because not only do they open the load door so that the load door may fit under the overhead basket 16 of the harvester 14, but after they have collected the cotton from the overhead basket, then by the expansion of the compression cylinders 64, the door is moved inward to compress the cotton against the discharge side 42 of the basket 34. As will be discussed in detail later, it is contemplated that a first overhead basketful 16 would be dumped into the load door and compressed into the basket, then a second basketful 16 dumped into the opened load door and it compressed as much as possible inside the basket, and then yet a third basketful 16 would be dumped into the load door and the door brought, at least, into the upright position if not further compressed into the basket.

The load door will have wing walls 76 which, in the transport position, will be alongside the front 36 and the back 38 of the basket. These wing walls will also have a framework of structural metal and covered with mesh or screened wire. When the cotton is dumped from the overhead basket 16 onto the door the wing walls will act as a container to contain the cotton until it is brought within the basket by the operation described above.

Discharge panel 78 is pivoted by discharge hinges 80 to the bottom 44. The hinges 80 attach edge 81 of the panel to discharge edge 82 of the bottom. Discharge hydraulic cylinders 84 connect the metal framework of the basket to the discharge panel to open the same. Normally the discharge panel will either be in the closed position so that the top or distal edge 85 of the panel is against the basket 34 at about the mid-point, or in the open position where the panel 78 forms a continuation of the bottom 44 of the basket.

Load side shaft 86 extends longitudinally in the basket below the load door hinges 62. Discharge hydraulic motor 88 will be attached to the shaft 86. The discharge motor 88 is a rotary motor. The hydraulic lines, valves, etc., to 88 have not been shown nor have any of the other hydraulic lines or valves been shown, inasmuch as they are within the skill of the art.

Preferably the hydraulic motor is reversible. Four distal shafts 90 extend longitudinally along the distal edge 85 of the panel. The load shaft 86 is journalled for rotation. The load shaft has a plurality of sprockets 92 thereon. The sprockets are all aligned so that chains 94 are trained around the sprockets 92. The chains extend from the load side shaft 86 to the distal shaft 90.

Elongated drags 96 are mounted between sets of chains 92. As may be seen in the drawings, particularly FIG. 5, there are four sets of drags 96. There are a total of eight chains 94. There is a distal shaft 90 for each set of drags. The distal shafts are mounted for adjustment to longitudinally adjust the tension in the chains 96. A sprocket 92 is journaled to the distal shafts for each chain 96.

The drags 96 are elongated members which are slightly shorter than the distance between the opposing chains to which they are attached. FIG. 7 illustrates the attachment of the drags to the chain. Specifically, a tab or plate 99 is attached as by welding to one of the links of the chain. Near each end of the drag 96, a bolt or stud 97 is attached. Therefore the stud 97 can be placed through a suitable hole in the plate 99 and the drag thus held securely in position by nut 95. The drags will operate either ⅛ or 1/16 of an inch above the bottom 44 or the panel 78. It has been found that the drags, according to this design, will effectively remove all of the seed cotton which might be within the basket 34 with a minimum of wear.

For clarity and simplicity of the drawing, only a few of the drags have been illustrated in FIGS. 5 and 6. In practice the drags are spaced about 18 inches apart and therefore there are approximately 18 drags in each of the sections, which is to say there will be about 9 drags on top and 9 drags below the bottom and panel as they run.

It has been found that no particular mechanism is needed to hold the chains and drags in position. As the panel is folded up and down the chains will remain upon the sprockets during the movement in the folding of the panel 78. The drags are longitudinally aligned with the bottom of the basket. Upon proper operation of the discharge hydraulic motor 88, the shaft 86 will be rotated and that the drags will move the seed cotton thereupon. Assuming that the shafts are rotated in a counter-clockwise direction as seen from the rear of the unit, the seed cotton will be moved from the basket outward. Assuming that the basket is in the elevated position and the distal edge of the panel is over the module maker 18 will cause the seed cotton within the basket 34 to be discharged from the basket into the module maker 18 as is the purpose of the boll buggy 10. If for some reason it is desired not to transfer the entire load of the seed cotton within the basket 34 into the module maker 18, the rotation of the shafts may be stopped by the proper operation of the hydraulic valves (not shown) and also that the shafts may be reversed in their direction of rotation so that the cotton is brought back toward the basket.

As may be seen the shafts, sprockets, chains, elongated drags form a portion of moving means to move the seed cotton within the basket into the module maker.

The panel 78 also has wing walls 98 at the front and rear thereof to prevent the spillage and waste of seed cotton from the front and back of the panels during operation when the panel is in the extended position. The wing walls of the panel are of similar construction as the wing walls of the load door. Some operators may desire to attach a rubber curtain to the discharge side 42 immediately above the distal edge 85 when the panel 78 is closed. Such a curtain would extend downward about 10 inches and would also prevent spillage and waste of seed cotton upon opening the panel 78.

The embodiment shown and described above is only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:
1. A seed cotton boll buggy comprising:
 a) a base frame with
  i. a front and a rear,
  ii. ground engaging wheels, and
  iii. a hitch on the front of the frame,
 b) two guide columns on the frame, one at the front and one at the rear,
 c) a basket on the frame having
  i. a front,
  ii. a back,
  iii. a load side,
  iv. a discharge side,
  v. a bottom, and
  vi. a height,
 d) a load door on the load side of the basket,
 e) door hinges interconnecting the load door and the basket near the bottom to swing the door,
 f) compress means interconnecting the load door and basket for swinging the load door,
 g) a discharge panel on the discharge side of the basket,
 h) the panel having a basket edge and a distal edge,
 j) moving means on the bottom of the basket and the discharge panel for moving seed cotton from the load side to the discharge side of the basket and from the basket edge to the distal edge of the panel, and
 k) elevation means interconnecting the columns and the basket for elevating the basket.

2. The boll buggy as defined in claim 1 further comprising:
 l) panel hinges interconnecting the panel basket edge and the bottom of the basket to pivot the panel to the basket.

3. The boll buggy as defined in claim 1 further comprising:
 l) said load door having a height greater than the height of the basket,
 m) said compress means being capable of swinging a top of the load door to a top of the discharge side of the basket and also swinging the load door away from the load side of the basket.

4. The boll buggy as defined in claim 1 further comprising:
 l) said guide columns also forming a portion of a means for guiding the basket so that the basket is raised in a vertical rectilinear path.

5. The boll buggy as defined in claim 1 further comprising:
 l) hydraulic cylinders interconnecting the bottom of the basket at the load side to an outside portion of the load door above the door hinges,
 m) said door hydraulic cylinders forming a portion of said compress means.

6. The boll buggy as defined in claim 1 wherein a distance from the basket edge to the distal edge of the panel is about one half the height of the front of the basket.

7. The boll buggy as defined in claim 1 further comprising:
 l) a rotatable shaft extending along the load side of the bottom of the basket,
 m) shafts extending along the distal edge of the panel,
 n) each of said shafts carrying sprockets thereon,
 o) chains trained around the sprockets from the load side to the distal edge of the panel,
 p) said chains interconnected by elongated drags,
 q) said shafts, sprockets, chains, and elongated drags, forming a portion of said moving means.

8. The method of transferring seed cotton from an overhead basket of a cotton harvester to a module maker comprising the steps of:
 a) moving a basket on a boll buggy alongside the cotton harvester,
 b) extending a load door away from the basket on the boll buggy toward the cotton harvester,
 c) dumping seed cotton from the overhead basket of the cotton harvester onto the load door,
 d) pivoting the load door toward and into the basket, therefore transferring and compressing the seed cotton from the load door into the basket of the boll buggy,
 e) thereafter moving the basket to a cotton harvester,
 f) again extending the load door toward the cotton harvester,
 g) dumping seed cotton from the cotton harvester basket into the load door,
 h) again moving the load door toward the basket to transfer and compress the seed cotton from the load door into the basket,
 i) thereafter moving the basket to a module maker,
 j) elevating the basket to an elevation so that a bottom of the basket is about an elevation of a top of the module maker, k) extending a discharge panel from the basket over the top of the module maker, and l) moving the seed cotton by moving means within the basket into the module maker.

9. The invention as defined in claim 8 further comprising:

m) dumping seed cotton from cotton harvesters a total of at least three times before moving the seed cotton into the module maker.

* * * * *